US012537576B2

(12) United States Patent
Wang et al.

(10) Patent No.: US 12,537,576 B2
(45) Date of Patent: Jan. 27, 2026

(54) JOINT CHANNEL STATE INFORMATION FOR VIRTUAL USER EQUIPMENT

(71) Applicant: GOOGLE LLC, Mountain View, CA (US)

(72) Inventors: Jibing Wang, San Jose, CA (US); Erik Stauffer, Mountain View, CA (US)

(73) Assignee: Google LLC, Mountain View, CA (US)

( * ) Notice: Subject to any disclaimer, the term of this patent is extended or adjusted under 35 U.S.C. 154(b) by 802 days.

(21) Appl. No.: 17/787,037

(22) PCT Filed: Nov. 24, 2020

(86) PCT No.: PCT/US2020/062031
§ 371 (c)(1),
(2) Date: Jun. 17, 2022

(87) PCT Pub. No.: WO2021/126495
PCT Pub. Date: Jun. 24, 2021

(65) Prior Publication Data
US 2023/0078501 A1    Mar. 16, 2023

Related U.S. Application Data

(60) Provisional application No. 62/949,742, filed on Dec. 18, 2019.

(51) Int. Cl.
*H04B 7/06* (2006.01)
*H04L 5/00* (2006.01)
*H04B 7/0417* (2017.01)

(52) U.S. Cl.
CPC ......... *H04B 7/0626* (2013.01); *H04B 7/0628* (2013.01); *H04L 5/0057* (2013.01); *H04B 7/0417* (2013.01)

(58) Field of Classification Search
CPC .. H04B 7/0626; H04B 7/0628; H04B 7/0417; H04B 7/026; H04L 5/0057;
(Continued)

(56) References Cited

U.S. PATENT DOCUMENTS

2012/0113950 A1   5/2012   Skov et al.
2012/0114050 A1   5/2012   Osterling
(Continued)

FOREIGN PATENT DOCUMENTS

CN   104604285 A   5/2015
CN   108370266 A   8/2018
(Continued)

OTHER PUBLICATIONS

"3rd Generation Partnership Project; Technical Specification Group Radio Access Network; Evolved Universal Terrestrial Radio Access (E-UTRA); Physical layer procedures (Release 15)," 3GPP TS 36.213 V15.5.0 (Mar. 2019), pp. 1-58.
(Continued)

*Primary Examiner* — Abdullahi Ahmed
(74) *Attorney, Agent, or Firm* — Womble Bond Dickinson (US) LLP

(57) ABSTRACT

A base station (BS) communicatively connected to a group including a first user equipment (UE) and a second UE can implement a method. The method includes determining (316 or 416), by processing hardware of the base station, a channel state information (CSI) process configuration for the group. The method also includes transmitting (318) a control signal including the CSI process configuration to the group, and transmitting (336) a reference signal to the group in accordance with the CSI process configuration. The method further includes, in response to transmitting the reference signal to the group, receiving (354) from at least one UE of the group an indication of joint channel state of the group.

19 Claims, 8 Drawing Sheets

(58) Field of Classification Search
CPC ... H04L 1/0031; H04L 1/0026; H04L 5/0094; H04L 5/006; H04L 5/0023; H04L 5/0048
See application file for complete search history.

(56) References Cited

U.S. PATENT DOCUMENTS

| | | |
|---|---|---|
| 2013/0039297 A1 | 2/2013 | Wang |
| 2013/0078991 A1* | 3/2013 | Nam ................... H04W 28/04 455/423 |
| 2013/0114656 A1 | 5/2013 | Sayana et al. |
| 2013/0258965 A1 | 10/2013 | Geirhofer et al. |
| 2015/0111519 A1 | 4/2015 | Li et al. |
| 2015/0117377 A1 | 4/2015 | Maaref et al. |
| 2015/0162966 A1 | 6/2015 | Kim et al. |
| 2015/0200754 A1 | 7/2015 | Sayana et al. |
| 2015/0230284 A1 | 8/2015 | Nimbalker et al. |
| 2016/0295621 A1 | 10/2016 | Han et al. |
| 2016/0337485 A1 | 11/2016 | Nuggehalli et al. |
| 2016/0373970 A1 | 12/2016 | Kulal |
| 2017/0078011 A1 | 3/2017 | Kim et al. |
| 2017/0187507 A1* | 6/2017 | Yum ..................... H04B 7/06 |
| 2017/0310375 A1* | 10/2017 | Kim ................... H04B 7/0478 |
| 2018/0241523 A1* | 8/2018 | Noh .................... H04L 5/005 |
| 2019/0082428 A1 | 3/2019 | Maaref et al. |
| 2019/0124633 A1 | 4/2019 | Hang et al. |
| 2019/0208539 A1 | 7/2019 | Christoffersson et al. |
| 2019/0312616 A1 | 10/2019 | Christoffersson et al. |
| 2020/0092685 A1 | 3/2020 | Fehrenbach et al. |
| 2020/0336178 A1* | 10/2020 | Ma .................... H04B 7/0452 |
| 2020/0367101 A1 | 11/2020 | Paladugu et al. |
| 2021/0288707 A1* | 9/2021 | Hang ................... H04B 7/026 |
| 2024/0080862 A1* | 3/2024 | Garcia ................ H04L 12/1845 |

FOREIGN PATENT DOCUMENTS

| | | |
|---|---|---|
| CN | 109314556 A | 2/2019 |
| CN | 110268743 A | 9/2019 |
| EP | 2 869 478 A1 | 5/2015 |
| EP | 2 999 287 A1 | 3/2016 |
| EP | 3425936 A1 | 1/2019 |
| WO | WO-2016/120686 A1 | 8/2016 |
| WO | WO-2017/148173 A1 | 9/2017 |
| WO | WO-2018/202798 A1 | 11/2018 |
| WO | WO-2020/078381 A1 | 4/2020 |
| WO | WO-2020/150997 A1 | 7/2020 |

OTHER PUBLICATIONS

Cooperative Access among UEs in Cellular Networks. Waseda University, 2015.
International Search Report and Written Opinion for Application No. PCT/US2020/062031, dated Feb. 19, 2021.
R1-091835. Texas Instruments, May 4-8, 2009 (Retrieved from https://www.3gpp.org/ftp/tsg_ran/WG1_RL1/TSGR1_57/Docs/).
Understanding the Standards for LTE-Advanced Enhancements 2016 Update (retrieved from: <https://www.5gamericas.org/wp-content/uploads/2019/07/Inside_3GPP_Release_13_Understanding_the_Standards_for_LTE_Advanced_Enhancements_Final.pdf>).
Office Action in related Chinese application 202080093595.3 dated Aug. 30, 2024, pp. 1-13.

* cited by examiner

JOINT CHANNEL STATE INFORMATION FOR VIRTUAL USER EQUIPMENT

FIELD OF THE DISCLOSURE

This disclosure relates generally to wireless communications and, more particularly, to grouping strategies for coordinating user devices in wireless communication systems.

BACKGROUND

In wireless communication systems, such as fifth-generation (5G) radio access ("NR") networks, a base station (e.g., a gNB) must configure downlink and uplink transmissions to and from user devices within the base station's coverage area. To perform this configuration, the base station transmits control information indicating random access channel information, scheduling grants, power control commands, coding information, etc. via a control channel. However, handling the configuration of a large number of user devices can require extensive control channel overhead (e.g., time and frequency resources), leading to a reduction in network efficiency.

Further, the signal strength at the location of a particular user device (commonly referred to as a user equipment ("UE")) and/or the reception capability of a particular UE may be poor. For example, the UE may be located at a cell edge or experiencing fading effects due to Doppler shift, multipath propagation, or shadowing. The base station may struggle to establish communication with the UE, further diminishing overall network efficiency.

To address some of these issues, various schemes for coordination (or "grouping") among different UEs have been proposed. Despite these various schemes, there are further opportunities to capture more of the network efficiency improvements that UE groupings can offer, and to flexibly scale coordination schemes to better leverage larger UE group sizes.

SUMMARY

According to techniques of this disclosure, a number of UEs form a group (referred to herein as a "UE Coordination Set" or "UECS") that a base station views—at least in some respects and at some protocol stack layers—as a single UE or "virtual" UE. While in previously proposed UE grouping schemes, the base station of the serving cell is unaware of changing joint reception capabilities of the UE group (or UECS, as the UE group is referred to herein) over time (e.g., as particular UEs experience poor channel conditions), the techniques of this disclosure provide feedback to the base station that the base station can use to quickly adapt downlink transmissions to suit current capabilities of the UECS.

In particular, a coordinating or "master" UE of the UECS collects individual reception capability information from each UE in the UECS. The capability information may indicate how many multiple-input, multiple-output (MIMO) layers the UE can process, and possibly other information (e.g., whether the UE can perform non-linear processing on a received MIMO signal). For example, a UE with two antennas may report a 2-layer, 2×2 MIMO processing capability. The master UE analyzes the individual UE capabilities to determine a joint capability for the UECS, which the master UE reports to the base station. For instance, if the UECS consists of two UEs that each support 2-layer MIMO processing under the current channel conditions, the master UE may report a 4-layer MIMO processing capability for the UECS. As another example, the same two UEs may only be able to support single-input, single-output (SISO) processing under their current channel conditions, and the master consequently reports a 2-layer MIMO processing capability for the UECS. The master UE then distributes the joint capability information to the other UEs in the UECS to enable joint transmission from the UECS to the base station.

Based on the received joint capability information of the UECS, the base station defines/determines a channel state information (CSI) process configuration that is specific to the UECS. The CSI process configuration includes, for example, timing and frequency information for a reference signal (e.g., for a CSI-RS) that the base station will send to the UECS. The CSI process configuration may also include other information needed for the CSI process, such as code domain information (e.g., for signal pre-coding). The base station transmits a control signal (e.g., a radio resource control (RRC) message, or a lower layer message) including the CSI process configuration to the UECS. The UECS jointly receives the control signal, and the UEs process the CSI process configuration in order to, for example, identify the time and frequency resources on which the UEs are to receive the reference signal. In some implementations and/or scenarios, the base station defines resources for, and transmits, multiple reference signals (e.g., one per base station antenna).

At a later time, the base station transmits the reference signal to the UECS, and each of the UEs performs measurements on the received reference signal to determine UE-specific channel quality and generate a UE-specific CSI report. Each UE-specific CSI report may include parameters such as a channel quality indicator (CQI), a precoding matrix indicator (PMI), a rank indicator (RI), and/or a modulation and coding scheme (MCS) index. The UEs in the UECS forward their respective individual CSI reports to the master UE, which then calculates a joint CSI report for the UECS as a whole. The joint CSI report may include the same types of parameters as the individual CSI reports, for example. In some implementations, the parameters include parameters that indicate how many streams, or MIMO layers, the base station should use. Moreover, one or more parameters in the joint CSI report may depend on certain joint processing capabilities of the UECS. For example, if the UECS only includes UEs that are capable of linear joint processing, then the master UE may report a lower/worse joint CQI (in the joint CSI report) than would be the case if at least one UE were capable of non-linear joint processing.

One example embodiment of these techniques is a method, in a base station communicatively connected to a group including a first UE and a second UE. The method includes determining, by processing hardware of the base station, a CSI process configuration for the group and transmitting a control signal including the CSI process configuration to the group. The method also includes transmitting a reference signal to the group in accordance with the CSI process configuration. The method further includes, in response to transmitting the reference signal to the group, receiving from at least one UE of the group an indication of joint channel state of the group.

Another example embodiment of these techniques is a base station comprising hardware and configured to implement the method above.

An additional embodiment of these techniques is a method in a first UE of a group that includes the first UE and a second UE. The method includes receiving a reference signal from a base station and determining, by processing hardware of the first UE, a first indication of UE-specific channel state based on the reference signal. The method also includes receiving, from the second UE via a local wireless network, a second indication of UE-specific channel state determined by the second UE based on the reference signal. The method further includes determining, by the processing hardware and based on at least the first indication of UE-specific channel state and the second indication of UE-specific channel state, an indication of joint channel state. The method also includes transmitting the indication of joint channel state to the base station.

Another example embodiment of these techniques is a UE comprising hardware and configured to implement the method above.

An additional embodiment of these techniques is a method in a first UE of a group that includes the first UE and a second UE. The method includes receiving a reference signal from a base station and determining, by processing hardware of the first UE, an indication of UE-specific channel state based on the reference signal. The method also includes transmitting the indication of UE-specific channel state to the second UE via a local wireless network. The method further includes receiving an indication of joint channel state from the second UE via the local wireless network, and transmitting the indication of joint channel state to the base station.

Another example embodiment of these techniques is a UE comprising hardware and configured to implement the method above.

DETAILED DESCRIPTION OF THE DRAWINGS

Figure 1:
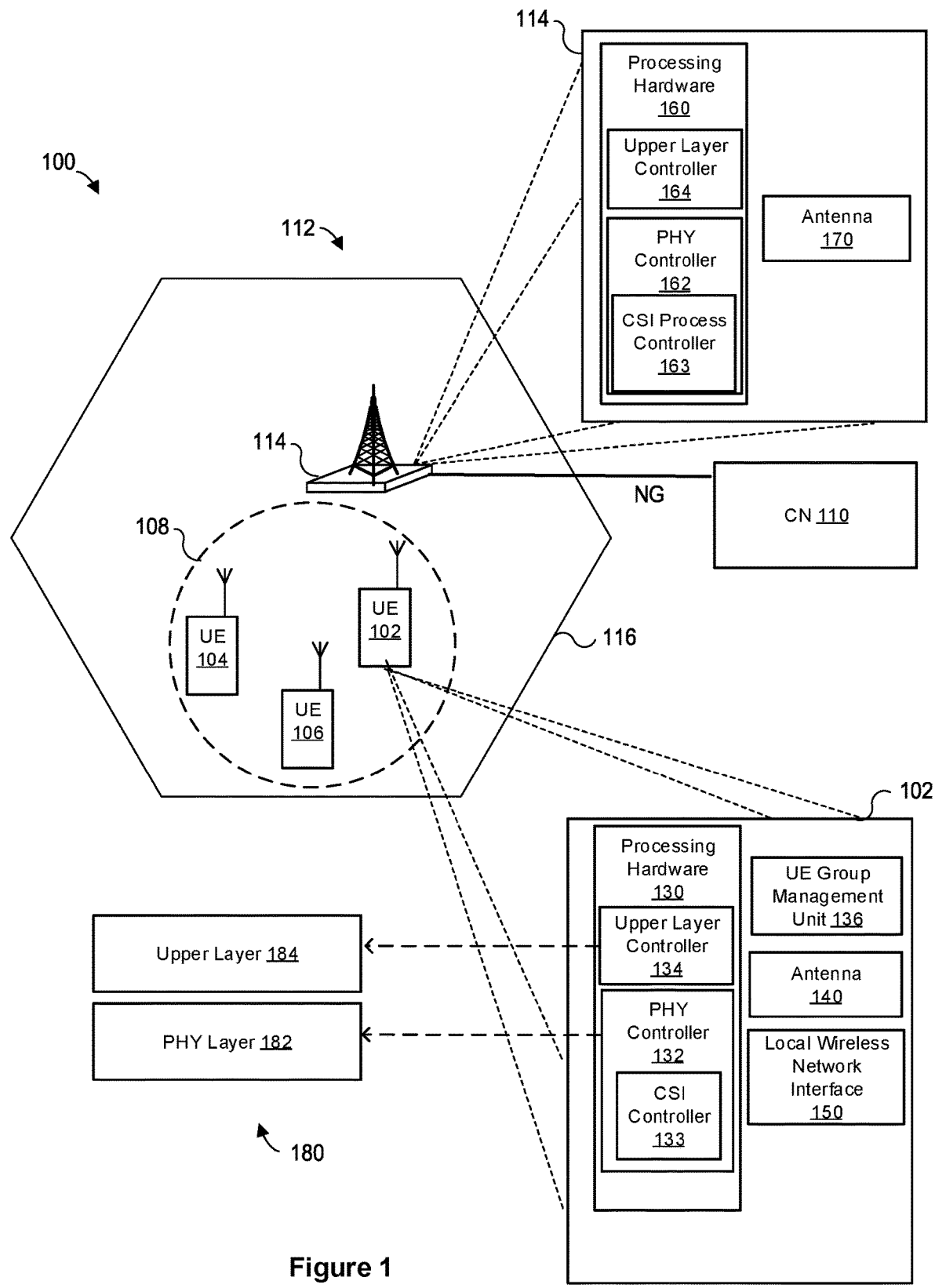
FIG. 1 illustrates an example communication system in which joint channel state feedback techniques for a User Equipment Coordination Set (UECS) of this disclosure can be implemented.

FIG. 1 illustrates an example communication system 100 in which joint channel state feedback techniques for a User Equipment Coordination Set (UECS) of this disclosure can be implemented. The communication system 100 includes a number of user equipment (UE), including UE 102, UE 104, and UE 106. Each of UEs 102, 104, and 106 can be any suitable device capable of wireless communication (e.g., any of the exemplary user devices discussed below after the description of the figures). In the depicted scenario, the UEs 102, 104, and 106 form a UE group 108, also referred to herein as a UECS 108. While FIG. 1 depicts three UEs, the UECS 108 may include any number (greater than one) of UEs. The UECS 108 can locally coordinate uplink (UL) transmission and downlink (DL) reception to and from a base station 114, using techniques described in further detail below.

The base station 114 is communicatively connected to a core network (CN) 110 via an NG interface, for example. In some implementations, the base station 114 is a 5G New Radio (NR) base station operating as a g Node B (gNB), and the CN 110 is a 5G core network (5GC). In other implementations, however, the communication system 100 can include one or more base stations that operate according to radio access technologies (RATs) of types other than NR, and these base stations can be connected to CNs of other types. The CN 110 can be, for example, a 5G core network (5GC), a less advanced core network (e.g., an evolved packet core (EPC)), or, conversely, a more advanced core network.

The base station 114 is associated with a RAN 112 and provides coverage to a cell 116. While FIG. 1 depicts the base station 114 as associated with only one cell 116, it is understood that the base station 114 may also cover one or more additional cells not shown in FIG. 1. Further, the RAN 112 can include any suitable number of base stations that collectively support one or more RATs. Each UE, such as the UE 102, can communicatively connect with the RAN 112 via the base station 114 when operating within the cell 116, and in turn can communicatively connect with the CN 110 via the RAN 112.

The UE 102 is equipped with at least processing hardware 130, a UE group management unit 136, at least one antenna 140, and a local wireless network interface 150. While FIG. 1 depicts only the UE 102 as including the processing hardware 130, the UE group management unit 136, the antenna 140, and the local wireless network 150, it is understood that each of the UEs 104 and 106 also include the same or similar elements. The processing hardware 130 can include one or more general-purpose processors (e.g., CPUs) and at least one non-transitory computer-readable memory storing instructions executable on the one or more general processors and/or special-purpose processing units, such as a wireless communication chipset.

The processing hardware 130 includes a physical (PHY) layer controller 132. The PHY layer controller 132 is responsible for internal procedures at a PHY layer 182 of a wireless communication protocol stack 180, such as demodulating and decoding downlink control and data signals received from a base station (e.g., the base station 114), encoding and modulating uplink control and data signals, and so on. Additionally, the PHY layer controller 132 includes a channel state information (CSI) controller 133. As referred to herein, the CSI may conform to the CSI defined by current standards (e.g., 3GPP Technical Specifications 36.312 and/or 38.312), or may correspond to channel state information more generally. The CSI controller 133 supports functions related to determining reception capability information, joint reception capability information, CSI reports, and/or joint CSI reports, as described below with reference to FIGS. 3A-4.

The processing hardware 130 also includes an upper layer controller 134. The upper layer controller 134 is responsible for internal procedures at a corresponding upper layer 184 above the PHY layer 182 of the protocol stack 180, such as aggregating uplink data and disaggregating downlink data for the UECS 108. The upper layer 184 may be, for example, a medium access control (MAC) layer, a packet data convergence protocol (PDCP) layer, or a radio link control (RLC) layer. For example, the upper layer controller 134 may support channel access, addressing, quality of service (QoS) and other functions of a MAC layer, user plane data transfer, control plane data transfer, integrity protection and other functions of a PDCP layer, or segmentation and other functions of an RLC layer. While not shown in FIG. 1, the processing hardware 130 may also include a controller for each of a number of other layers, such as a Radio Resource Control (RRC) controller and a mobility management (MM) controller associated with RRC and MM layers of the protocol stack 180, respectively.

The UE group management unit 136 of the UE 102 is generally responsible for functions related to UE grouping functions, such as sharing signals with the other UEs of the UECS 108 (e.g., the UEs 104 and 106) as discussed further below. The UEs of the UECS 108 may communicate with each other over at least one local wireless network, which is not depicted in FIG. 1. The local wireless network may correspond to a personal area network (PAN), near-field communication (NFC), Bluetooth™, wireless local area network (WLAN), or any other suitable communication standard(s) or protocol(s). The local wireless network interface 150 of the UE 102 generally facilitates communications with the other UEs of the UECS 108 on the local wireless network. The UE group management unit 136 may be jointly implemented by the processing hardware 130 and the local wireless network interface 150, or may be implemented by another controller of the UE 102 that is not shown in FIG. 1.

The base station 114 includes at least one antenna 170 to communicate with the other elements of the communication system 100. The base station 114 also includes processing hardware 160, which can include one or more general-purpose processors (e.g., CPUs) and at least one non-transitory computer-readable memory storing instructions executable on the one or more general processors and/or special-purpose processing units, such as a wireless communication chipset. Similar to the processing hardware 130 of the UE 102, the processing hardware 160 can include a PHY layer controller 162 and an upper layer controller 164 corresponding to the PHY layer 182 and upper layer 184, respectively, of the protocol stack 180. Controllers 162 and 164 may perform similar or corresponding functions as controllers 132 and 134, but from the perspective of the base station 114 rather than the UE 102. For example, the PHY layer controller 162 may encode and modulate downlink control and data signals transmitted to the UECS 108, and the upper layer controller 164 may aggregate downlink data for the UECS 108 and disaggregate uplink data received from the UECS 108.

In addition, the PHY layer controller 162 includes a CSI process controller 163. The CSI process controller 163 may perform similar functions as the CSI controller 133, but from the perspective of the base station 114 rather than the UE 102. For example, the CSI process controller 163 defines CSI process configurations that the base station 114 will transmit to the UECS 108, as described below with reference to FIGS. 3B and 4.

The upper layer controllers 134 and 164, PHY layer controllers 132 and 162, CSI controller 133 and CSI process controller 163, and UE group management unit 136 can each be implemented using any suitable combination of hardware, software, and/or firmware. In one example implementation, the controllers 132, 133, 134, 162, 163, and 164 and/or the UE group management unit 136 are a set of instructions that the respective processing hardware 130 or 160 executes to perform the various functions described herein.

As noted above, the UE 102 includes at least one antenna 140, for receiving signals transmitted to the UE 102 and transmitting signals from the UE 102. The UE 102 may be equipped with multiple antennas 140 to support multiple-input, multiple-output (MIMO) communications, or with only a single antenna 140. For example, the UE 102 may have two transmit-receive antennas to support two simultaneous transmission/reception paths, or may have separate transmit and receive antennas, etc. MIMO communication between the base station 114 and the UEs 102, 104 is discussed below with reference to FIG. 2. Moreover, as discussed further below, the base station 114 (e.g., the PHY controller 162) may determine an antenna port at the PHY layer 182 for each physical antenna 140 of the UE 102.

Initially, as noted above, the UEs 102, 104, and 106, and possibly other UEs not depicted in FIG. 1, form the UECS 108. The UECS 108 may be formed in a variety of ways, depending on the implementation and/or scenario. In some implementations, for example, UEs can locally coordinate with each other, with little or no input from the base station 114, to form the UECS 108. The UEs 102, 104, and 106 can choose to coordinate with each other based on, for example, their respective distances from each other, and/or based on other suitable factors. The UEs 102, 104 and 106 may jointly select a coordinating or "master" UE from among the UEs 102, 104 and 106, for example, based on the relative processing capabilities of the UEs 102, 104 and 106 and/or other factors (e.g., proximity to the base station 114).

In other implementations, the base station 114 directs or partially directs formation of the UECS 108. The base station 114, for example, detects the UEs 102, 104, and 106 within the cell 116, and assigns each UE to the UECS 108. The base station 114 may also request that the UEs 102, 104 and 106 form the UECS 108, and only assign a particular UE to the UECS 108 if that UE responds with an acknowledgement and/or approval of the request. The base station 114 may select UEs for the UECS 108 based on the location of each UE relative to the base station 114 and to the other UEs, and/or other factors. The base station 114 may also select certain UEs for the UECS 108 depending on beam scheduling, for example, with the base station 114 only selecting UEs that are in the same beam. The base station 114 may also select which single UE is to function as the master UE of the UECS 108.

Grouping of UEs into the UECS 108 can provide various advantages. In some implementations, for example, the UECS 108 can jointly receive downlink control and data signals from the base station 114, and jointly transmit uplink control and data signals to the base station 114. Because each UE of the UECS 108 is equipped with at least one antenna (e.g., the antenna 140 of the UE 102), the UECS 108 can utilize the antennas of the individual UEs as a distributed antenna arrangement for both reception and transmission. Accordingly, the UECS 108 can have reception and transmission capabilities that exceed those of the individual UEs 102, 104, and 106. In addition, if one UE of the UECS 108 experiences poor reception, that UE may rely on the other UEs of the UECS 108 to receive information from the base station 114 and forward that information to the UE with poor reception. Further, the UECS 108 can leverage the combined processing power of the UEs 102, 104, and 106 to demodulate data and control signals, thereby improving reception for the UECS 108 as a whole.

The master UE may function as a "joint-receiver" UE to perform the functions necessary to facilitate joint reception, or the master UE may delegate that responsibility by assigning another UE to be the joint-receiver UE. In some implementations, the base station 114 directs the master UE to select a joint-receiver UE, or directly assigns the joint-receiver UE. In other implementations, the master UE selects a joint-receiver UE with little or no input from the base station. The master UE may change which UE acts as the joint-receiver UE depending on changing power and reception conditions and/or capabilities of the UEs in the UECS 108. Regardless of how the joint-receiver UE is selected, or re-assigned, the joint-receiver UE may facilitate joint reception using any of the various techniques described below with respect to FIGS. 3B-4.

In some implementations of the communication system 100, the UECS 108 and base station 114 take advantage of the distributed antenna arrangement of the UEs by implementing multiple-input, multiple-output (MIMO) communications for the uplink and/or downlink. MIMO communications can improve data rates (with spatial multiplexing, i.e., transmitting different data from different antennas) or error rates (with spatial diversity, i.e., transmitting redundant data on different antennas), for both the uplink and downlink.

Figure 2:
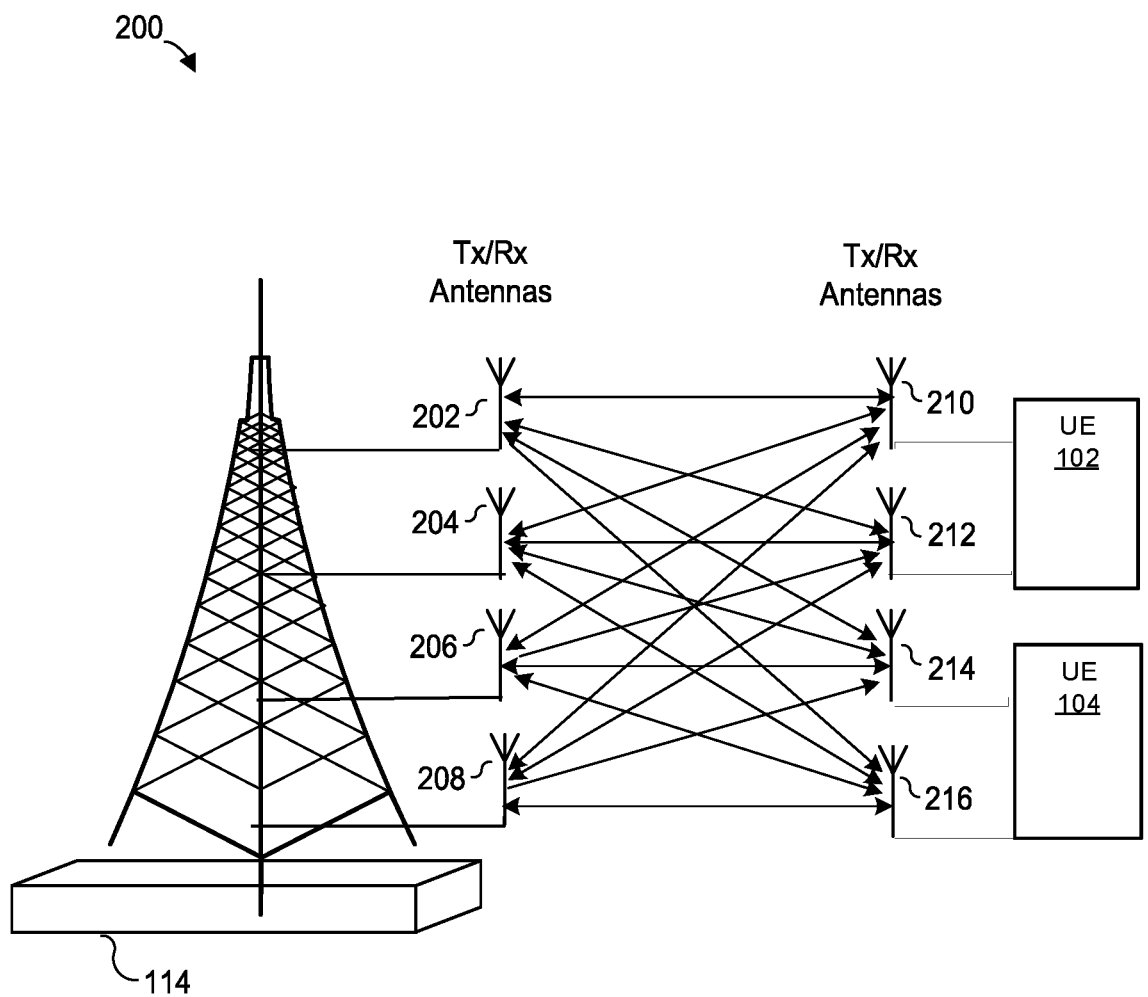
FIG. 2 illustrates an example antenna arrangement supporting multiple-input, multiple-output (MIMO) communications between UEs and a base station.

In the example antenna arrangement 200 of FIG. 2, the base station 114 includes four transmit-receive antennas 202, 204, 206, and 208 each having its own transmit/receive circuitry in the radio frequency (RF) front end, the UE 102 includes two transmit-receive antennas 210 and 212 each having its own transmit/receive circuitry in the RF front end, and the UE 104 also includes two transmit-receive antennas 214 and 216 each having its own transmit/receive path in the RF front end. Accordingly, each of the UEs 102 and 104 can support two downlink and two uplink streams, corresponding to two MIMO layers (2×2 MIMO communication). The base station 114, using its four transmit-receive antennas, can support four MIMO layers. While a single one of the UEs 102, 104 is only capable of 2×2 MIMO communication with the base station 114, the UEs 102 and 104 combined, as the UECS 108, are capable of 4×4 communication with the base station 114. It is understood that the UEs 102 and 104, and/or the base station 114, may instead have more or fewer antennas than are depicted in FIG. 2, thereby supporting more or fewer MIMO layers.

To configure MIMO communications with the UECS 108, the base station 114 first determines the total number of antennas the UECS 108 (i.e., the UEs 102 and 104) has available, and the signal quality of the different streams between the UECS 108 and the base station 114. It is understood that references made herein to the number of different antennas of a UE or base station may mean the number of physical antennas, or may mean the number of antennas or antenna sets that are coupled to different RF front ends. Thus, for example, a combination of a patch antenna and a monopole antenna at a UE or base station may "count" as only one antenna if both antennas are coupled to the same RF front end (e.g., for purposes of generating a particular antenna radiation pattern).

Generally speaking, for the downlink, the base station 114 determines how to configure MIMO communications with a UE (e.g., the UE 102) based on CSI received from the UE 102. The base station 114 similarly defines a CSI process configuration that indicates time and frequency resources that the base station 114 will use to transmit a reference signal (e.g., a CSI-RS) to the UECS 108. In some implementations, the UE 102 can use (e.g., perform measurements on) the reference signal to estimate various parameters relating to channel quality and to estimate suitable MIMO or SISO configurations for the downlink, and transmits this information to the base station 114 in a CSI report.

Parameters included in the CSI report indicate how well the UE 102 (and more specifically, the antennas of UE 102) is currently able to receive from the base station 114 (i.e., as a result of the channel conditions currently experienced at the antennas of the UE 102). For instance, the CSI report can include indications of how many streams, or MIMO layers, the UE 102 can currently process, thereby indicating a number of antennas of the UE 102 that are available for reception. Examples of the parameters that the UE 102 can include in the CSI report include a channel quality indicator (CQI), a rank indicator (RI), and a precoding matrix indicator (PMI). The CQI may indicate a modulation and coding scheme (MCS) (e.g., by including an MCS index).

The RI, for instance, specifies a suggested number of MIMO layers the base station 114 should use when transmitting to the UE 102, and is based on the number of antennas the UE 102 has available to receive MIMO streams. The PMI may suggest a suitable MIMO precoding matrix for the specified RI, and the CQI may specify a modulation and coding scheme (MCS) suitable for the specified PMI. Further, the CSI report can also include a CSI-RS resource indicator (CRI) to identify a beam the CSI report is based on (for example, if the base station 114 transmits reference signals on multiple beams). In implementations where the base station 114 is a gNB, the UE 102 also can include in the CSI report a layer indicator (LI) to notify the base station 114 which MIMO layer the UE 102 has identified as the best one, as well as a Synchronization Signal Block (SSB) Physical Broadcast Channel (PBCH) Block Resource Indicator (SSBRI) and layer 1 reference signal received power (L1-RSRP), which the base station 114 can use in beam management and mobility procedures.

If the UEs 102 and 104 in FIG. 2 have not formed a UE group (e.g., the UECS 108), then the base station 114 transmits a reference signal to each of the UEs 102 and 104 in accordance with a CSI process configuration defined by the base station 114 for each of the UEs 102 and 104 (i.e., with different time/frequency resources for the two reference signals). Each of the UEs 102 and 104 receives its respective reference signal, processes the respective reference signal, and transmits a UE-specific CSI-report (i.e., corresponding only to the individual UE) to the base station 114. However, if the UEs 102 and 104 are included in the UECS 108, the base station 114 can define a single CSI process configuration for the UECS 108 as a whole, and transmit a reference signal in accordance with the CSI process configuration defined for the group. The UECS 108 can jointly receive and process the control signal including the CSI process configuration, and each UE can receive and process (e.g., perform measurements on) the reference signal. Based on CSI reports generated by the individual UEs of the UECS 108, the UECS 108 determines a joint CSI report, which may (depending on current channel conditions for each UE) reflect a greater reception capability than is possible for any individual UE.

Using the techniques discussed below with reference to FIGS. 3A-7, the UEs of the UECS 108 can determine a joint CSI report based on the joint reception capability of the group, and transmit the joint CSI report together to the base station 114. While FIGS. 3A-7 and the accompanying descriptions refer specifically to the UEs 102, 104, 106, the UECS 108, and the base station 114 of FIG. 1, it is understood that the following techniques may be implemented by other components and/or in systems other than the communication system 100 of FIG. 1.

Figure 3A:
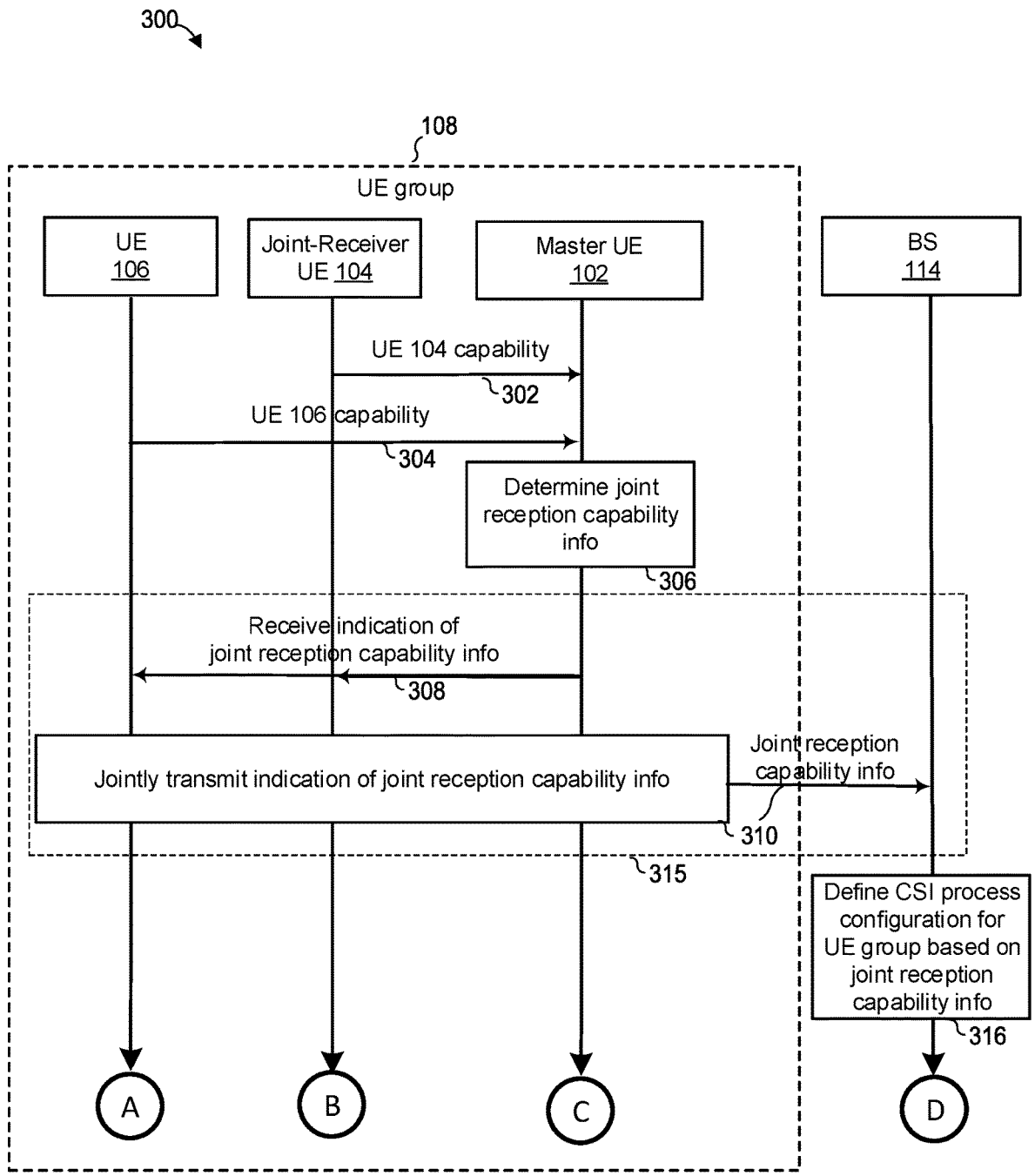
FIGS. 3A and 3B are a messaging diagram of an example scenario in which the UEs of a UECS transmit joint reception capability and state information of the UECS to a base station.
Figure 3B:
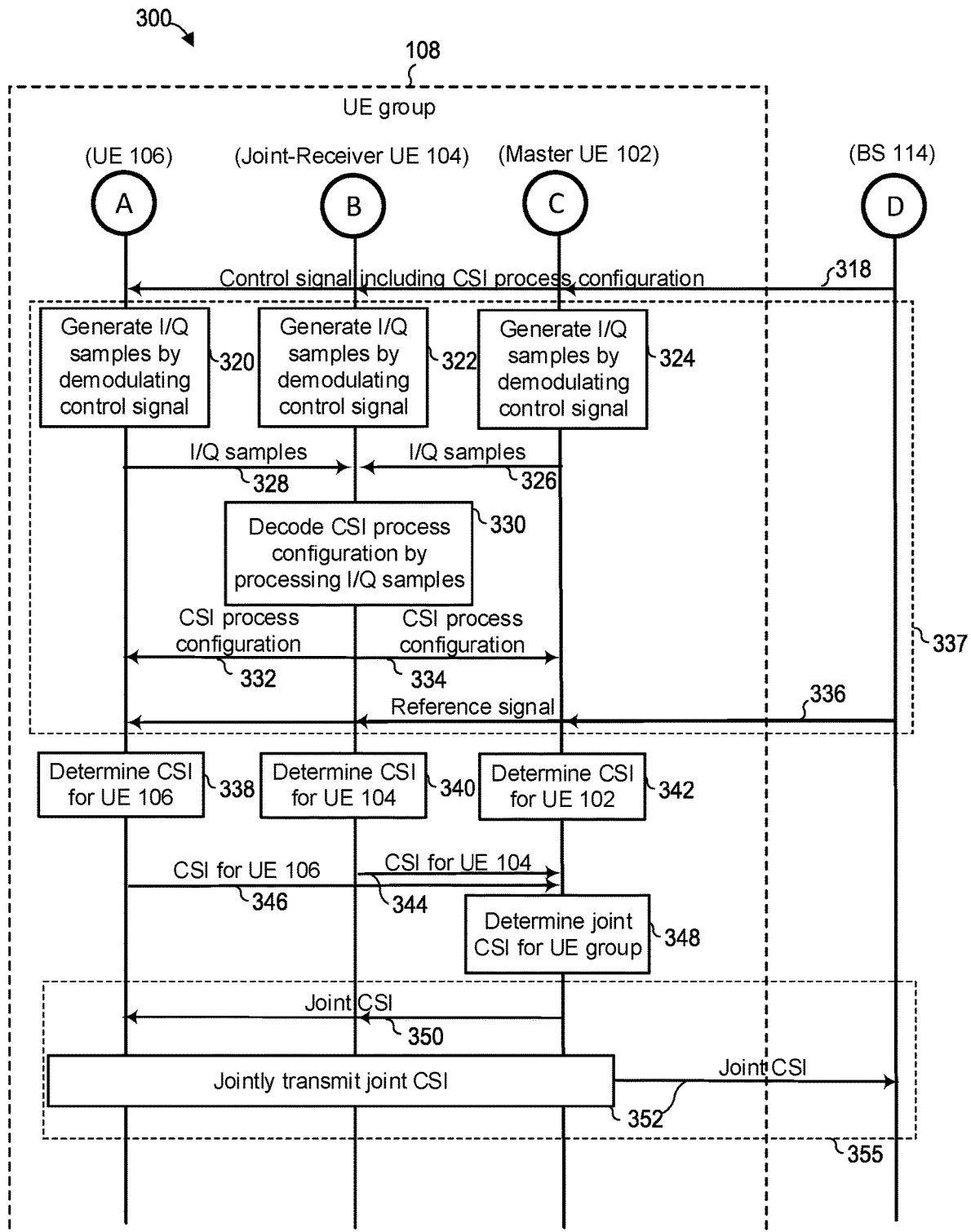

FIGS. 3A and 3B together illustrate a messaging diagram of a first example scenario 300 in which the UEs of the UECS 108 transmit joint reception capability and state information of the UECS 108 to the base station 114. In the example scenario 300, the UE 102 is acting as the master UE of the UECS 108, the UE 104 is acting as the joint-receiver UE 104 of the UECS 108, and the UE 106 is another UE in the UECS 108 that is neither the master nor the joint-receiver. It is understood that, in some scenarios and/or implementations, the UEs 102, 104, and/or 106 can have other roles within the UECS 108. Moreover, in some scenarios and/or implementations, the master UE 102 does not assign a joint-receiver UE, and instead performs the joint-reception functions.

The example scenario 300 begins when a UE in a UECS 108, such as the joint-receiver UE 104, transmits 302 its own UE-specific reception capability information to the master UE 102 via a local wireless network (e.g., the local wireless network discussed above in connection with FIG. 1). For each UE, the UE-specific reception capability information may indicate, for example, how many MIMO layers the UE can process, or can currently process under current channel conditions. For example, a UE with two antennas can report a 2-layer, 2×2 MIMO processing capability. In some cases, UE-specific reception capability information indicates that the corresponding UE only supports SISO processing. In some implementations, the UE-specific reception capability information also indicates whether the UE can perform linear or non-linear processing on a received MIMO (or SISO) signal. More generally, the UE-specific reception capability information may indicate a number of antennas of the UE, or include an indication of a number of antenna ports the base station 114 can determine for the UE. Further, the UE-specific reception capability information reported by each UE may be specific to each of one or more carrier frequency bands. For instance, a UE may report a first number of MIMO layers available for processing signals carried on a first band (e.g., low band), and a second, different number of MIMO layers available for processing signals carried on a different, second band (e.g., mid band).

Another UE, such as UE 106, may also transmit 304 its UE-specific reception capability information to the master UE 102 via the local wireless network. While FIG. 3A depicts the UE 106 as transmitting 304 its UE-specific reception capability information after the joint-receiver UE 104, the relative timing of the transmissions differ from what is shown. For example, the UE 106 may transmit 304 its information prior to, or at the same time that, the joint-receiver UE 104 transmits 302 its information. In addition, while in scenario 300 the UEs 104 and 106 transmit 302, 304 their UE-specific reception capability information directly to the master UE 102, the master UE 102 may instead receive the UE-specific reception capability information from the UEs 104 and 106 in other ways. In some scenarios, for example, the UE 106 may first transmit its UE-specific reception capability information to the joint-receiver UE 104 or another UE of the UECS 108, and the joint-receiver UE 104 or other UE may forward the information corresponding to the UE 106 to the master UE 102 (e.g., that information alone, or grouped with the UE-specific reception capability information of the forwarding UE). Such scenarios can occur, for example, if the UE 106 has a poor wireless local connection with the master UE 102 but can communicate better with the joint-receiver UE 104 or another UE of the UECS 108 perhaps using a different wireless local communication technology such as Bluetooth™. The UE-specific reception capability information of a particular UE may be transmitted through several UEs of the UECS 108 before it reaches the master UE 102, depending on channel conditions and the capabilities of the respective UEs.

By analyzing the UE-specific reception capability information received from the other UEs of the UECS 108, as well as its own UE-specific reception capability, the master UE 102 determines 306 joint reception capability information corresponding to the reception capability of the UECS 108 as a whole (i.e., when jointly receiving signals from the BS 114). At least in some scenarios, the joint reception capability of the UECS 108 is different from the reception capability of any individual UE in the UECS 108. For example, the number of MIMO layers that the UECS 108 can process may scale with the number of UEs (and possibly UE antennas) in the UECS 108. If the information received from the joint-receiver UE 104 and the UE 106 at events 302 and 304 indicates that each of the UEs 104 and 106 currently support 2-layer MIMO processing under the current channel conditions, for example, and if the master UE 102 itself supports 2-layer processing, then the master UE 102 determines that the UECS 108 supports 6-layer MIMO processing.

Additionally, in some implementations, the master UE 102 can delegate the task of determining 306 the joint reception capability information to the joint-receiver UE 104 or another designated UE of the UECS 108. In such implementations, the master UE 102 collects the individual UE-specific reception capability information and forwards the grouped information to the joint-receiver UE 104 or other designated UE, or informs the other UEs of the UECS 108 to transmit their UE-specific reception capability information directly to the joint-receiver UE 104 or other designated UE.

In some implementations (not shown in FIG. 3A), after determining 306 the joint reception capability information, the master UE 102, alone, transmits an indication of the joint reception capability information to the base station 114. Alternatively, as depicted in FIG. 3A, the master UE 102 may leverage the joint transmission ability of the UECS 108 to provide the joint reception capability information to the base station 114. In such implementations, the master UE 102 transmits 308 an indication of the joint reception capability information to the UEs 104 and 106. The master UE 102 can choose a joint transmission scheme and coordinate joint transmission from the group in any suitable manner. For example, the master UE 102 can generate I/Q samples corresponding to the indication of joint channel state and transmit these I/Q samples to the UEs 104 and 106 to facilitate joint transmission. The UEs of the UECS 108 (i.e., the UEs 102, 104, and 106) can then act as a distributed antenna transmitter, and jointly transmit 310 the indication of joint reception capability information to the base station 114. For the joint transmission 310, the UEs use their respective antennas to transmit the indication of joint reception capability information to the base station 114 in a time-aligned, signal-aligned manner. Events 308 and 310 are collectively referred to in FIG. 3A as event 315.

The base station 114 then defines 316 a CSI process configuration for the UECS 108 based on the received joint reception capability information, such that the CSI process configuration is a joint CSI process configuration for the UECS 108 as a whole. To define the CSI process configuration, the base station 114 allocates resource elements for a reference signal (e.g., for a CSI-RS) that the base station 114 will transmit to the UECS 108 at a later time. More specifically, the CSI process configuration includes time and frequency domain information that the UECS 108 can use to prepare to receive the reference signal. The CSI process configuration may also include other information, such as an indication of what information the base station 114 would like to receive from the UECS 108 when the UECS 108 provides a joint CSI report in response to the reference signal. For example, the CSI process configuration may include an indication of PHY layer 182 parameters the base station 114 seeks from the UECS 108.

After defining 316 a CSI process configuration for the UECS 108, the base station 114 transmits 318 a control signal including the CSI process configuration to the UECS 108, as shown in FIG. 3B. In some implementations, the base station 114 transmits 318 the control signal to the UECS 108 via a single control channel (e.g., PDCCH) that is specific to the UECS 108. The control signal including the CSI process configuration may be an RRC message, or a higher level message such as a MAC message, RLC message, or PDCP message. In some implementations and scenarios, the base station 114 includes the CSI process configuration within downlink control information (DCI) included in the control signal.

Each UE of the UECS 108 can receive the same control signal (channel conditions permitting), with the UECS 108 effectively operating as a distributed antenna receiver. If a particular UE is experiencing problems receiving signals from the base station 114 but can still communicate with one or more other UEs in the UECS 108, other UEs of the UECS 108 may receive the control signal, process the control signal in the manner discussed below, and forward the processed control information to that UE using a wireless local connection.

In the example scenario 300, all of the UEs 102, 104, and 106 receive the control signal transmitted 318 by the base station 114. Thus, each of the UE 106, the UE 104, and the master UE 102 generates (320, 322, and 324, respectively) respective I/Q samples by demodulating the received control signal. The I/Q samples represent the control signal after the RF signal is down-converted and demodulated into in-phase (I) and quadrature (Q) components. In the example scenario 300, the UE 104 is acting as the joint-receiver UE that performs joint processing. Thus, the UE 106 transmits 328 its I/Q samples to the joint-receiver UE 104, and the master UE 102 transmits 326 its I/Q samples to the joint-receiver UE 104, via the local wireless network.

After the joint-receiver UE 104 receives the I/Q samples from the UEs 102, 106, the joint-receiver UE 104 decodes 330 the CSI process configuration by processing the I/Q samples received from the UEs 102, 106 together with the I/Q samples that the joint-receiver UE 104 itself generated 322. To decode 330 the CSI process configuration, the joint-receiver UE 104 first time aligns and consolidates (e.g., sums) the I/Q samples of UEs 102, 104, and 106. By consolidating the I/Q samples, the joint-receiver UE 104 produces a linear power gain and can obtain a stronger signal compared to the signal received by any individual UE, thereby increasing the likelihood that the joint-receiver UE 104 will be able to successfully decode 330 the CSI process configuration (and the DCI as a whole, if the CSI process configuration is included in the DCI).

In the implementation shown in FIG. 3B, the joint-receiver UE 104 then distributes the decoded CSI process configuration by transmitting (332, 334) the CSI process configuration to the other UEs (106, 102) in the UECS 108 via the local wireless network. In other implementations and/or scenarios, the joint-receiver UE 104 transmits 334 the CSI process configuration to the master UE 102 but not to the UE 106, and the master UE 102 then transmits the CSI process configuration to each UE in the UECS 108 (possibly excluding the joint-receiver UE 104), or to at least one other UE in the UECS 108 that then further distributes the CSI process configuration (e.g., forming part of a transmission chain within the local wireless network). Events 320 through 336 are collectively referred to in FIG. 3B as event 337.

After receiving the CSI process configuration, each of the UEs 102, 104, and 106 may self-configure according to the information in the CSI process configuration, in order to prepare to receive the reference signal from the base station 114. That is, when the base station 114 at some later point transmits 336 the reference signal (e.g., CSI-RS) to the UECS 108, the UEs 102, 104, and 106 know the timing and the frequency of that reference signal, and therefore can detect and measure the reference signal. For ease of explanation, this discussion refers to the base station 114 transmitting 336 a "reference signal," in the singular. It is understood, however, that the base station 114 may transmit a set of multiple reference signals to the UECS 108 as a whole. For example, the base station 114 may transmit a different reference signal from each antenna (e.g., of multiple antennas 170) of the base station 114.

Each UE that detects/receives the reference signal (i.e., the UE 106, the joint-receiver UE 104, and the master UE 102 in scenario 300) determines (338, 340, and 342, respectively) a UE-specific CSI report based on the reference signal. As discussed above with reference to FIG. 2, the UE-specific CSI report includes a variety of information estimated by the UE based on how well the UE was able to receive the reference signal. For example, the UE-specific CSI report may include a CQI, PMI, and/or RI as determined by the individual UE based on its measurements of the reference signal, with the CQI indicating an MCS that the individual UE supports. The information in the UE-specific CSI report indicates how many MIMO layers the individual UE can process and/or how many antennas the UE has available for reception.

The UEs 104 and 106 transmit (344, 346) their respective UE-specific CSI reports to the master UE 102, which processes the UE-specific CSI reports to determine 348 a joint CSI report for the UECS 108. Alternatively, the master UE 102 may assign another UE of the UECS 108 (e.g., the joint-receiver UE 104) to perform the processing to determine the joint CSI report. If the master UE 102 assigns the joint-receiver UE 104 to determine the joint CSI report, for example, then the UE 106 and the master UE 102 transmit their respective UE-specific CSI reports to the joint-receiver UE 104.

The joint CSI report may include the same types of parameters as the individual, UE-specific CSI report, but the values of the parameters reflect the current channel quality and current reception capabilities of the UECS 108 as a whole. The joint CSI report is, in some implementations and scenarios, different from the UE-specific CSI report for any individual UE. In some implementations, the parameters of the joint CSI report indicate how many streams, or MIMO layers, the base station 114 should use to transmit to the UECS 108. One or more parameters in the joint CSI report may depend on joint processing capabilities of the UECS 108 (e.g., as determined 306 by the master UE 102). For example, if the UECS 108 includes only UEs that are capable of linear joint processing, then the master UE 102 may determine a joint CQI of the joint CSI report that is lower/worse than if at least one UE were capable of non-linear joint processing. In some implementations, the master UE 102 determines the joint CQI specifically based on the processing capability of the current joint-receiver UE (i.e., in this example, based on whether UE 104 is capable of non-linear joint processing). Moreover, the master UE 102 may choose a particular UE as the joint-receiver UE based at least in part on that UE being capable of non-linear joint processing, particularly if other available UEs of the UECS 108 are only capable of linear joint processing.

As another example, the joint CSI report may also include (e.g., within a CQI of the joint CSI report) a suggested MCS that can be supported by the UECS 108 during joint reception, and/or otherwise indicate a suitable MCS for the UECS 108. The suggested MCS generally depends on the joint reception capability information of the UECS 108. That is, in at least some scenarios, the UECS 108 can successfully (jointly) receive signals from the base station 114 that use the suggested MCS, but each individual UE of the UECS 108 is unable to do so.

In some implementations (not shown in FIG. 3B), after the master UE 102 (or another UE of the UECS 108, if the master UE 102 has delegated the determination of the joint CSI report) determines 348 the joint CSI report, the master UE 102 alone transmits the joint CSI report to the base station 114. Alternatively, as depicted in FIG. 3B, the master UE 102 may leverage the joint transmission ability of the UECS 108 to provide the joint CSI report to the base station 114 (e.g., similar to step 315 of FIG. 3A). In such implementations, the master UE 102 first transmits 350 the joint CSI report to the UEs 104 and 106. As discussed with reference to event 308, the master UE 102 may facilitate joint transmission by generating I/Q samples corresponding to the joint CSI report and transmitting these I/Q samples to the UEs 104 and 106. The UEs of the UECS 108 (i.e., the UEs 102, 104, and 106) then act as a distributed antenna transmitter to jointly transmit 352 the joint CSI report to the base station 114. Events 350 and 352 are collectively referred to in FIG. 3B as event 355.

In some implementations, the sequence of events shown in FIG. 3B is repeated whenever the base station 114 defines a new CSI process configuration for the UECS 108. For example, the sequence of events may be repeated because the base station 114 has received a new indication of joint reception capability information from the UECS 108 (e.g., similar to event 310) perhaps reflective of a new UECS composition of UEs, or possibly because the base station has received a joint CSI report from the UECS 108 that requires an updated channel configuration (e.g., similar to event 352).

Figure 4:
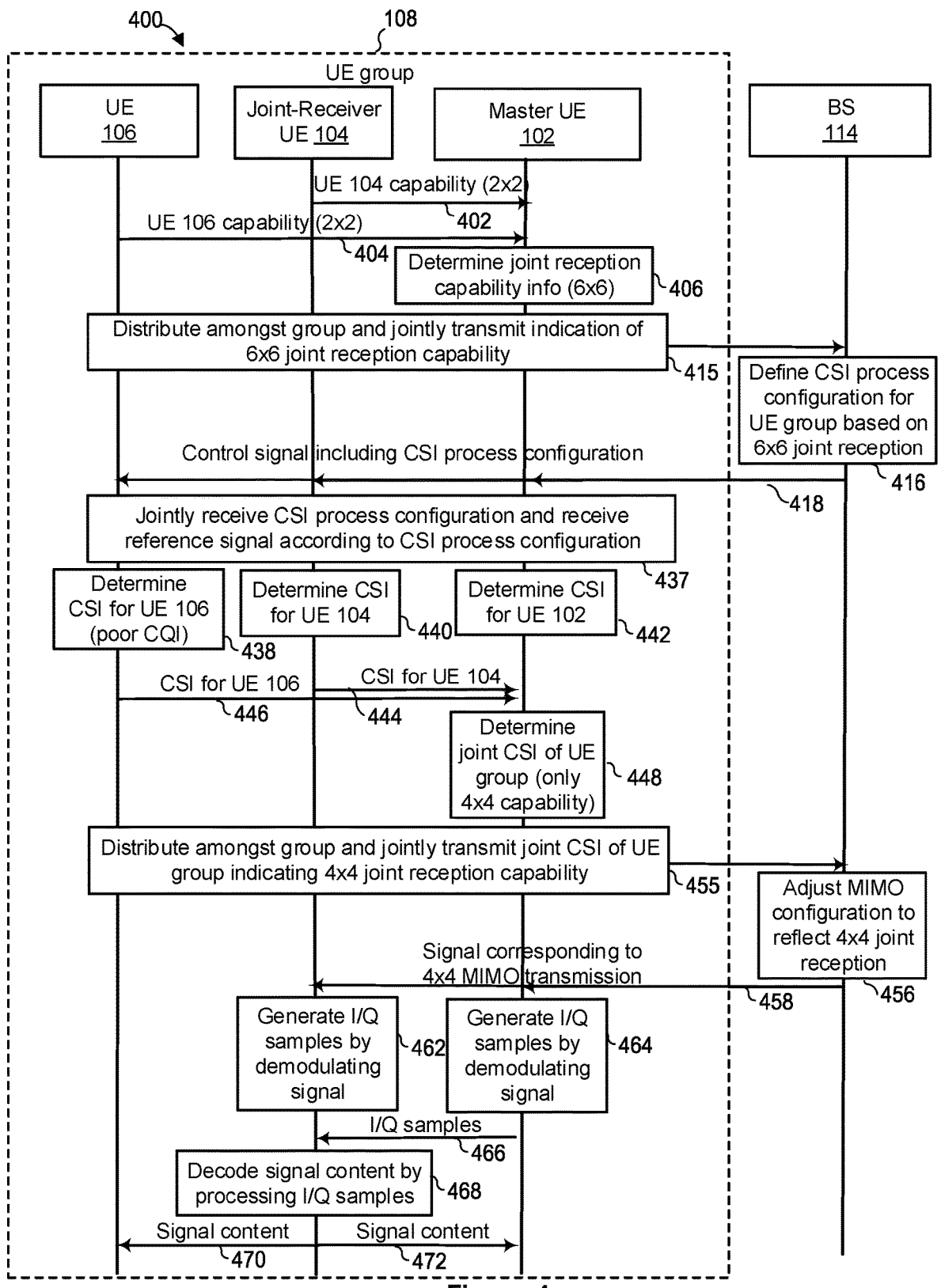
FIG. 4 is a messaging diagram of a more specific example scenario in which one UE of the UECS reports a poor channel quality indicator (CQI) to the master UE.

FIG. 4 is a messaging diagram of a more specific example scenario in which one UE of the UECS 108 (UE 106) reports a poor CQI to the master UE 102. In the example scenario 400, the UECS 108 includes the master UE 102, the joint-receiver UE 104, and the UE 106. As mentioned earlier, although the joint-receiver UE 104 is shown as a separate UE, the master UE 102 in other scenarios also performs the functions of the joint-receiver and thus UE 104 is not present or behaves similar to non-master, non-joint-receiver UE 106. The scenario 400 begins when, similar to 302, the UE 104 transmits 402 its UE-specific reception capability information to the master UE 102. In the scenario 400, the UE 104 has two transmit-receive antennas and RF front ends (e.g., as in FIG. 2), and its UE-specific reception capability information therefore indicates that the UE 104 can support 2-layer (2×2) MIMO. Similar to 304, the UE 106 also transmits 404 its UE-specific reception capability information to the master UE 102. In the scenario 400, the UE 106 also has two transmit-receive antennas (e.g., as in FIG. 2), and its UE-specific reception capability information likewise indicates that the UE 106 can support 2-layer MIMO. The master UE 102 analyzes the UE-specific reception capability information received from the UEs 104 and 106 to determine 406 joint reception capability information for the UECS 108. Combining the capabilities of the UE 104 and the UE 106 with its own 2-layer reception capability, the master UE 102 determines 406 joint reception capability information indicating a 6-layer (6×6) MIMO capability.

At event 415, the UECS 108 then distributes the 6×6 joint reception capability information amongst the group, and jointly transmits an indication of the 6×6 joint reception capability information to the base station 114. Event 415 may be similar to event 315 of FIG. 3A, for example. The base station 114 then defines 416 a CSI process configuration for the UECS 108 based on the 6×6 joint reception capability reported by the UECS 108, and transmits 418 the CSI process configuration to the UECS 108. At event 437, the UEs of the UECS 108 jointly receive the CSI process configuration, prepare to receive a reference signal using the CSI process configuration, and receive the reference signal according to the CSI process configuration. Event 437 may be similar to event 337 of FIG. 3A, for example.

The UEs 106, 104, and 102 use (e.g., measure) the reference signal to determine (438, 440, and 442, respectively) their respective UE-specific CSI reports. In the scenario 400, the UE 106 is experiencing poor channel conditions (e.g., due to fading, multipath, distance from the base station 114, etc.), and therefore determines 438 a CSI report that includes a poor CQI. For example, the UE 106 may measure a weak/noisy reference signal on either of its two antennas (e.g., because of a low signal-to-noise ratio (SNR) or signal-to-interference-plus-noise ratio (SINR)). Conversely, in the scenario 400, the UE 104 is not experiencing poor channel conditions, and therefore determines 440 a CSI report that includes a better CQI.

The UEs 104 and 106 transmit (444, 446) their respective UE-specific CSI reports to the master UE 102, and the master UE 102 processes the received UE-specific CSI reports, and its own CSI report, to determine 448 a joint CSI report for the UECS 108. Because the CSI report for the UE 106 indicates a poor CQI, the joint CSI report indicates that the UECS 108 only has a 4-layer (4×4) MIMO reception capability, even though (under better conditions) the UECS 108 theoretically has a 6-layer MIMO reception capability, as was indicated by the joint reception capability information determined 406 earlier by the master UE 102.

At event 455, the master UE 102 distributes the joint CSI report to the UECS 108, and the UECS 108 jointly transmits the joint CSI report indicating a 4-layer MIMO reception capability to the base station 114. The event 455 may be similar to the event 355 of FIG. 3B, for example. The base station 114 then may adjust 456 any future transmissions and/or resource allocation for the UECS 106 to reflect the 4-layer MIMO reception capability of the UECS 108. In some implementations, the base station 114 may define a new CSI process configuration based on the received joint CSI report and transmit the new CSI process configuration to the UECS 108, similar to events 316 and 318, respectively, of FIGS. 3A and 3B.

For example, based on the received joint CSI report, the base station 114 may transmit 458 a signal (which could be either a control signal or a data signal) to the UECS 108 in accordance with the current 4-layer MIMO reception capability of the UECS 108. The UE 106, because of its poor CQI, does not effectively participate in the joint reception.

Instead, the UEs 104 and 102 jointly receive the 4×4 MIMO transmission, by operating as a distributed antenna receiver with a lower number of antenna elements. Thus, only the UEs 104 and 102 generate (462, 464) I/Q samples by demodulating the signal. If the UE 104 is acting as the joint-receiver UE 104, as is the case in scenario 400, then the UE 102 transmits 466 its I/Q samples to the joint-receiver UE 104. The joint-receiver UE 104 then may decode the signal content (control information or data, depending on the signal type) by processing the I/Q samples, similar to event 330 of FIG. 3A. The joint-receiver UE 104 then can transmit (470, 472) the control information or data to both the UE 106 and the UE 102.

Figure 5:
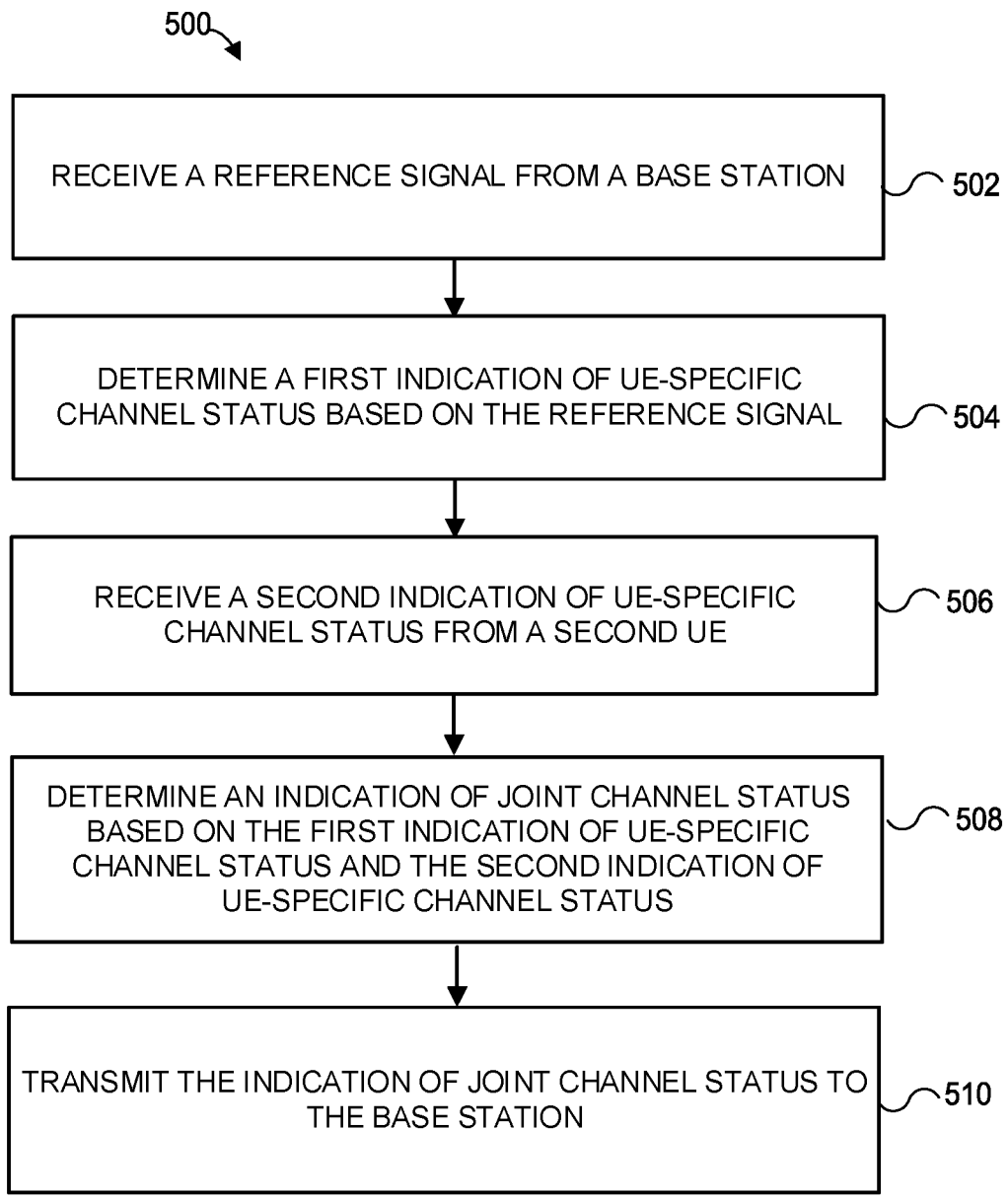
FIG. 5 is a flow diagram of an example method for providing a base station with an indication of joint channel state, which can be implemented in a UE of FIG. 1 that is acting as a master UE.

FIG. 5 is a flow diagram of an example method 500 for transmitting an indication of joint channel state to a base station (e.g., the base station 114), which can be implemented in a UE of FIG. 1. The UE that performs the method 500 may be acting as a master UE of a UECS (e.g., the master UE 102 of the UECS 108 in FIGS. 3A-4). In some implementations, the UE may also be acting as the joint-receiver UE. The method 500 begins at block 502, where the UE receives a reference signal from the base station (e.g., event 336 of FIG. 3B). Based on the reference signal, the UE determines a first indication of UE-specific channel state at block 504 (e.g., event 342 of FIG. 3B or event 442 of FIG. 4). Next, at block 506, the UE receives a second indication of UE-specific channel state from a second UE (e.g., event 344 or 346 of FIG. 3B, or events 444 or 446 of FIG. 4).

At block 508, the UE determines an indication of joint channel state based on the first indication of UE-specific channel state and the second indication of UE-specific channel state (e.g., event 348 of FIG. 3B or event 448 of FIG. 4). At block 510, the UE transmits the indication of joint channel state to the base station. The UE may transmit the indication of joint channel state (e.g., a joint CSI report) to the base station by itself, or may distribute the indication of joint channel state to the other UEs of the UECS, which jointly transmit the indication of joint channel state to the base station (e.g., event 355 of FIG. 3B or event 455 of FIG. 4).

Figure 6:
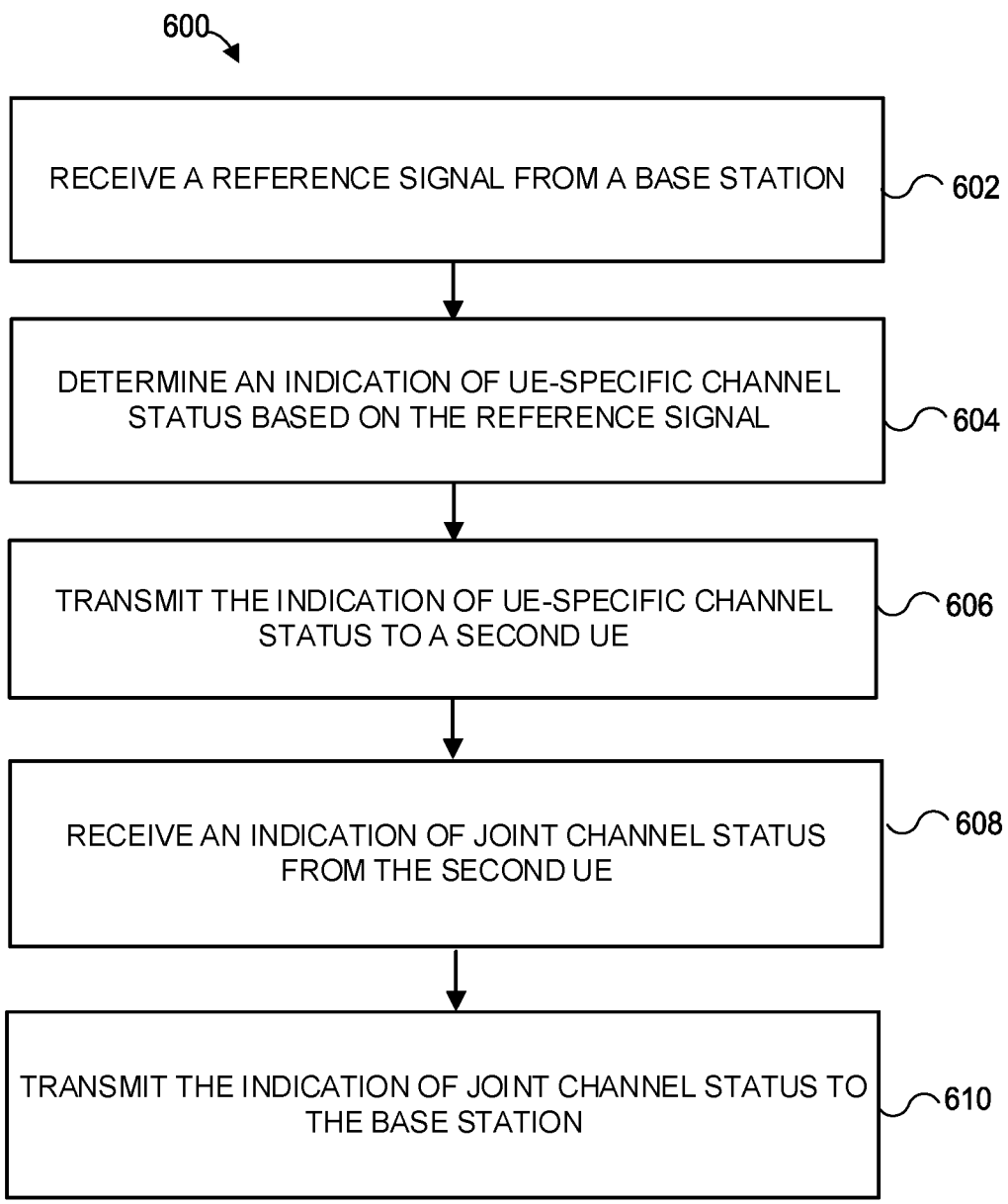
FIG. 6 is flow diagram of another example method for providing a base station with an indication of joint channel state, which can be implemented in a UE of FIG. 1 that is not acting as a master UE.

FIG. 6 is flow diagram of an example method 600 for transmitting an indication of joint channel state to a base station (e.g., the base station 114), which can be implemented in a UE of FIG. 1. The UE that performs the method 600 may be acting as a joint-receiver UE of the UECS 108 (e.g., the joint-receiver UE 104 of FIGS. 3A and 3B) or as another UE of the UECS 108 that is not the joint-receiver UE or the master UE (e.g., the UE 106 of FIGS. 3A and 3B).

The method 600 begins at block 602, where the UE receives a reference signal from the base station (e.g., event 336 of FIG. 3B). Based on the reference signal, the UE determines an indication of UE-specific channel state based on the reference signal at block 604 (e.g., event 340 of FIG. 3B or event 440 of FIG. 4B). In some implementations, blocks 602 and 604 include receiving and processing, respectively, a set of multiple reference signals (e.g., one per base station antenna, etc.). Next, at block 606, the UE transmits the indication of UE-specific channel state to a second UE (e.g., event 344 of FIG. 3B or event 444 of FIG. 4).

At block 608, the UE receives an indication of joint channel state from the second UE (e.g., event 350 of FIG. 3B). At block 610, the UE transmits the indication of joint channel state to the base station (e.g., event 352 of FIG. 3B).

Figure 7:
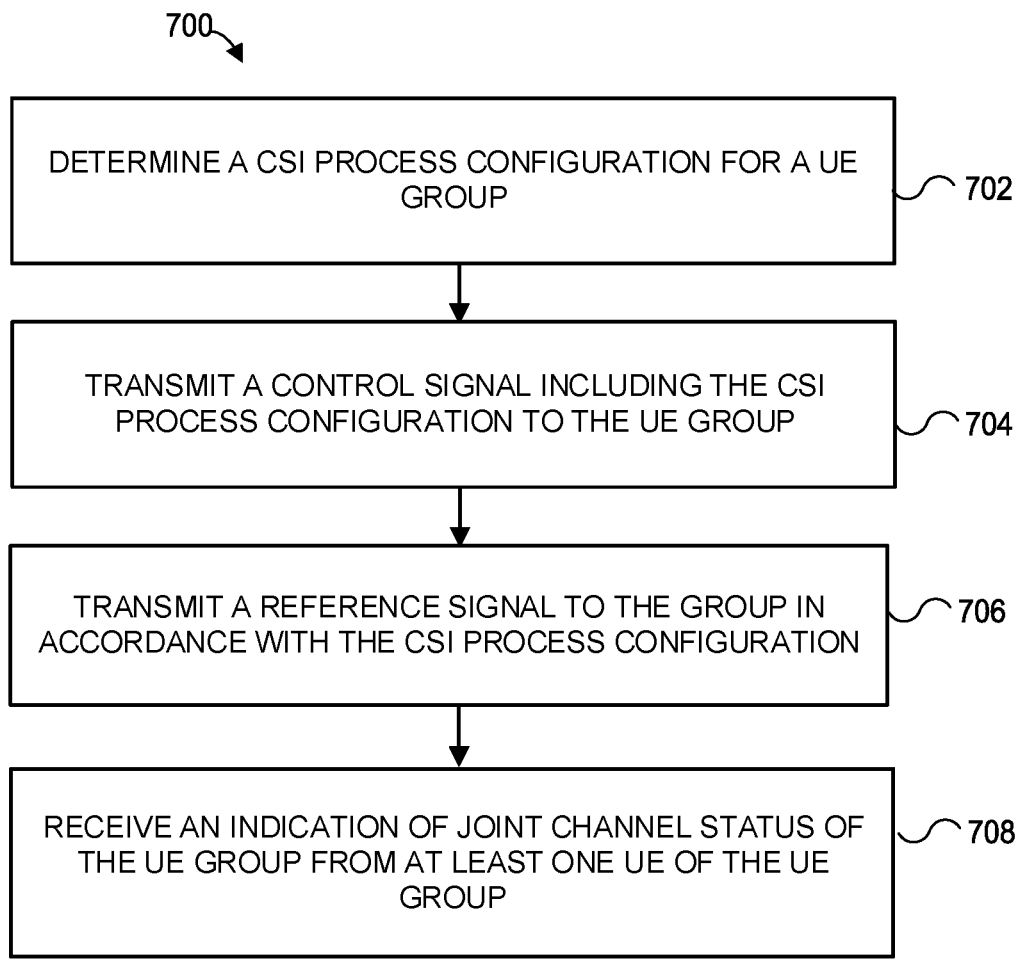
FIG. 7 is a flow diagram of an example method for obtaining joint channel state feedback from a UECS, which can be implemented in the base station of FIG. 1.

FIG. 7 is a flow diagram of an example method 700 for transmitting a CSI process configuration to a UECS (e.g., the UECS 108) and receiving an indication of joint channel state from the UECS, which can be implemented in a base station (e.g., the base station 114 of FIG. 1). The method 700 begins at block 702, where the base station determines a CSI process configuration for the UECS (e.g., event 316 of FIG. 3A or event 416 of FIG. 4). At block 704, the base station transmits a control signal including the CSI process configuration to the UECS (e.g., event 318 of FIG. 3B or event 418 of FIG. 4). Next, at block 706, the base station transmits a reference signal to the UECS in accordance with the CSI process configuration (e.g., event 336 of FIG. 3B or event 437 of FIG. 4). In some implementations, block 706 includes transmitting a set of multiple reference signals (e.g., one per base station antenna, etc.). At block 708, the base station receives an indication of joint channel state of the UECS from at least one UE of the UE group (e.g., event 354 of FIG. 3B or event 455 of FIG. 4).

Aspects

Aspect 1—A method in a base station communicatively connected to a group including a first user equipment (UE) and a second UE, the method comprising: determining, by processing hardware of the base station, a channel state information (CSI) process configuration for the group; transmitting a control signal including the CSI process configuration to the group; transmitting a reference signal to the group in accordance with the CSI process configuration; and in response to transmitting the reference signal to the group, receiving from at least one UE of the group an indication of joint channel state of the group.

Aspect 2—The method of aspect 1, wherein the indication of joint channel state indicates at least a multiple-input multiple-output (MIMO) reception capability of the group.

Aspect 3—The method of any one of aspects 1-2, wherein the indication of joint channel state indicates at least an antenna availability of the group.

Aspect 4—The method of any one of aspects 1-3, wherein the indication of joint channel state includes at least one of a precoding matrix indicator (PMI), a rank indicator (RI), or a modulation and coding scheme (MCS) index.

Aspect 5—The method of any one of aspects 1-4, wherein transmitting the reference signal in accordance with the CSI process configuration includes transmitting the reference signal in accordance with one or both of (i) time domain information included in the CSI process configuration, and (ii) frequency domain information included in the CSI process configuration.

Aspect 6—The method of one of aspects 1-5, wherein transmitting the control signal includes transmitting a medium access control (MAC) layer message, a radio link control (RLC) layer message, or a packet data convergence protocol (PDCP) layer message.

Aspect 7—The method of any one of aspects 1-5, wherein transmitting the control signal includes transmitting a radio resource control (RRC) layer message.

Aspect 8—The method of any one of aspects 1-7, further comprising: before transmitting the control signal, receiving, from at least one UE of the group, joint reception capability information of the group, wherein determining the CSI process configuration is based at least in part on the joint reception capability information.

Aspect 9—The method of aspect 8, wherein the joint reception capability information indicates how many multiple-input multiple-output (MIMO) layers are supported by the group.

Aspect 10—The method of any one of aspects 1-9, wherein receiving the indication of joint channel state includes receiving a joint channel quality indicator (CQI) of the group.

Aspect 11—A base station comprising hardware and configured to perform the method of any one of aspects 1-10.

Aspect 12—A method in a first user equipment (UE) of a group that includes the first UE and a second UE, the method comprising: receiving a reference signal from a base station; determining, by processing hardware of the first UE, a first indication of UE-specific channel state based on the reference signal; receiving, from the second UE via a local wireless network, a second indication of UE-specific channel state determined by the second UE based on the reference signal; determining, by the processing hardware and based on at least the first indication of UE-specific channel state and the second indication of UE-specific channel state, an indication of joint channel state; and transmitting the indication of joint channel state to the base station.

Aspect 13—The method of aspect 12, wherein transmitting the indication of joint channel state to the base station comprises: transmitting the indication of joint channel state to the second UE via the local wireless network for transmission to the base station.

Aspect 14—The method of any one of aspects 12-13, wherein the first indication of UE-specific channel state, the second indication of UE-specific channel state, and the indication of joint channel state indicates at least an antenna availability of the first UE, the second UE, and the group, respectively.

Aspect 15—The method of any one of aspects 12-14, wherein the indication of joint channel state indicates at least a joint MIMO reception capability of the group.

Aspect 16—The method of any one of aspects 12-15, wherein the indication of joint channel state includes at least one of a precoding matrix indicator (PMI), a rank indicator (RI), or a modulation and coding scheme (MCS) index.

Aspect 17—The method of any one of aspects 12-16, further comprising: before receiving the reference signal, receiving a control signal including a channel state information (CSI) process configuration from the base station, the CSI process configuration including one or both of (i) time domain information, and (ii) frequency domain information, for the reference signal.

Aspect 18—The method of aspect 17, further comprising: generating, by the processing hardware, first I/Q samples by demodulating the received control signal; receiving, from the second UE via the local wireless network, second I/Q samples corresponding to the control signal as received by the second UE; and decoding, by the processing hardware, the CSI process configuration by processing at least the first I/Q samples and the second I/Q samples.

Aspect 19—The method of aspect 17, further comprising: generating, by the processing hardware, I/Q samples by demodulating the received control signal; transmitting the I/Q samples to the second UE or a third UE of the group via the local wireless network; and receiving a decoded CSI process configuration from the second UE or the third UE via the local wireless network.

Aspect 20—The method of any one of aspects 17-19, wherein receiving the control signal includes receiving a medium access control (MAC) layer message, a radio link control (RLC) layer message, or a packet data convergence protocol (PDCP) layer message.

Aspect 21—The method of any one of aspects 17-19, wherein receiving the control signal includes receiving a radio resource control (RRC) layer message.

Aspect 22—The method of any one of aspects 17-21, further comprising: before receiving the control signal, receiving UE-specific reception capability information from the second UE via the local wireless network; determining, by the processing hardware, joint reception capability information of the group based on at least (i) the UE-specific reception capability information from the second UE and (ii) UE-specific reception capability information of the first UE; and transmitting the joint reception capability information to the base station.

Aspect 23—The method of aspect 22, wherein transmitting the joint reception capability information to the base station comprises: transmitting the joint reception capability information to the second UE via the local wireless network for transmission to the base station.

Aspect 24—The method of any one of aspects 22-23, wherein the joint reception capability information indicates how many multiple-input multiple-output (MIMO) layers are supported by the group.

Aspect 25—The method of any one of aspects 12-24, wherein determining the indication of joint channel state includes determining a joint channel quality indicator (CQI) based on (i) a first CQI included in the first indication of UE-specific channel state, and (ii) a second CQI included in the second indication of UE-specific channel state.

Aspect 26—The method of aspect 25, wherein determining the joint CQI is further based on whether at least one UE of the group supports non-linear joint processing.

Aspect 27—A user equipment (UE) comprising hardware and configured to perform the method of any one of aspects 12-26.

Aspect 28—A method in a first user equipment (UE) of a group that includes the first UE and a second UE, the method comprising: receiving a reference signal from a base station; determining, by processing hardware of the first UE, an indication of UE-specific channel state based on the reference signal; transmitting the indication of UE-specific channel state to the second UE via a local wireless network; receiving an indication of joint channel state from the second UE via the local wireless network; and transmitting the indication of joint channel state to the base station.

Aspect 29—The method of aspect 28, wherein the indication of UE-specific channel state indicates at least an antenna availability of the first UE, and the indication of joint channel state indicates at least an antenna availability of the group.

Aspect 30—The method of any one of aspects 28-29, wherein the indication of joint channel state indicates at least a joint MIMO reception capability of the group.

Aspect 31—The method of any one of aspects 28-30, wherein the indication of joint channel state includes at least one of a precoding matrix indicator (PMI), a rank indicator (RI), or a modulation and coding scheme (MCS) index.

Aspect 32—The method of any one of aspects 28-31, further comprising: before receiving the reference signal, receiving a control signal including a channel state information (CSI) process configuration from the base station, wherein the CSI process configuration includes one or both of (i) time domain information, and (ii) frequency domain information, for the reference signal.

Aspect 33—The method of aspect 32, further comprising: generating, by the processing hardware, first I/Q samples by demodulating the received control signal; receiving, from the second UE via the local wireless network, second I/Q samples corresponding to the control signal as received by the second UE; and decoding, by the processing hardware, the CSI process configuration by processing at least the first I/Q samples and the second I/Q samples.

Aspect 34—The method of aspect 32, further comprising: generating, by the processing hardware, I/Q samples by demodulating the received control signal; transmitting the I/Q samples to the second UE or a third UE of the group via the local wireless network; and receiving a decoded CSI process configuration from the second UE or the third UE via the local wireless network.

Aspect 35—The method of any one of aspects 32-34, wherein receiving the control signal includes receiving a medium access control (MAC) layer message, a radio link control (RLC) layer message, or a packet data convergence protocol (PDCP) layer message.

Aspect 36—The method of any one of aspects 32-34, wherein receiving the control signal includes receiving a radio resource control (RRC) layer message.

Aspect 37—The method of any one of aspects 32-36, further comprising: before receiving the control signal, transmitting UE-specific reception capability information to the second UE via the local wireless network; receiving joint reception capability information of the UE group from the second UE via the local wireless network; and transmitting the joint reception capability information to the base station.

Aspect 38—The method of aspect 37, wherein transmitting the joint reception capability information to the base station comprises: transmitting the joint reception capability information to the second UE via the local wireless network for transmission to the base station.

Aspect 39—The method of any one of aspects 37-38, wherein the joint reception capability information indicates how many multiple-input multiple-output (MIMO) layers are supported by the group.

Aspect 40—The method of any one of aspects 28-40, wherein receiving the indication of joint channel state includes receiving a joint channel quality indication (CQI).

Aspect 41—A user equipment (UE) comprising hardware and configured to perform the method of any one of aspects 28-40.

ADDITIONAL CONSIDERATIONS

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

What is claimed is:

1. A method in a base station communicatively connected to a group including a first user equipment (UE) and a second UE, the method comprising:
receiving, from at least one UE of the group, joint reception capability information of the group;
determining, by the base station, a channel state information (CSI) process configuration for the group based at least in part on the joint reception capability information;
transmitting a control signal including the CSI process configuration to the group;
transmitting a reference signal to the group in accordance with the CSI process configuration; and
in response to transmitting the reference signal to the group, receiving from at least one UE of the group an indication of joint channel state of the group.

2. The method of claim 1, wherein the indication of joint channel state indicates at least a multiple-input multiple-output (MIMO) reception capability of the group.

3. The method of claim 1, wherein the indication of joint channel state indicates at least an antenna availability of the group.

4. The method of claim 1, wherein the joint reception capability information indicates how many multiple-input multiple-output (MIMO) layers are supported by the group.

5. The method of claim 1, wherein receiving the indication of joint channel state includes receiving a joint channel quality indicator (CQI) of the group.

6. An apparatus for wireless communication at a first user equipment (UE) of a group that includes the first UE and a second UE, comprising:
a transceiver;
a memory; and
a processor coupled to the memory and the transceiver, the processor configured to:
transmit, to a base station, joint reception capability information of the group;
receive, from the base station, a control signal including a channel state information (CSI) process configuration of the group;
receive a reference signal from the base station;
determine a first indication of UE-specific channel state based on the reference signal;
receive, from the second UE via a local wireless network, a second indication of UE-specific channel state determined by the second UE based on the reference signal;
determine, based on at least the first indication of UE-specific channel state and the second indication of UE-specific channel state, an indication of joint channel state; and transmit the indication of joint channel state to the base station.

7. The apparatus of claim 6, wherein to transmit the indication of joint channel state to the base station the processor is configured to:
   transmit the indication of joint channel state to the second UE via the local wireless network for transmission to the base station.

8. The apparatus of claim 6, wherein the first indication of UE-specific channel state, the second indication of UE-specific channel state, and the indication of joint channel state indicates at least an antenna availability of the first UE, the second UE, and the group, respectively.

9. The apparatus of claim 6, wherein the CSI process configuration including one or both of time domain information, and frequency domain information, for the reference signal.

10. The apparatus of claim 9, wherein the processor is configured to:
    before reception of the control signal, receive UE-specific reception capability information from the second UE via the local wireless network; and
    determine the joint reception capability information of the group based on at least the UE-specific reception capability information from the second UE and UE-specific reception capability information of the first UE.

11. The apparatus of claim 6, wherein the indication of joint channel state indicates at least a joint MIMO reception capability of the group.

12. The apparatus of claim 9, wherein the processor is configured to:
    generate first I/Q samples by demodulating the received control signal;
    receive, from the second UE via the local wireless network, second I/Q samples corresponding to the control signal as received by the second UE; and
    decode the CSI process configuration by processing at least the first I/Q samples and the second I/Q samples.

13. The apparatus of claim 9, wherein the processor is configured to:
    generate I/Q samples by demodulating the received control signal;
    transmit the I/Q samples to the second UE or a third UE of the group via the local wireless network; and
    receive a decoded CSI process configuration from the second UE or the third UE via the local wireless network.

14. The apparatus of claim 10, wherein the joint reception capability information indicates how many multiple-input multiple-output (MIMO) layers are supported by the group.

15. The apparatus of claim 6, wherein to determine the indication of joint channel state the processor is configured to determine a joint channel quality indicator (CQI) based on a first CQI included in the first indication of UE-specific channel state, and a second CQI included in the second indication of UE-specific channel state.

16. The apparatus of claim 15, wherein the processor is configured to determine the joint CQI is further based on whether at least one UE of the group supports non-linear joint processing.

17. A method in a first user equipment (UE) of a group that includes the first UE and a second UE, the method comprising:
    transmitting, to a base station, joint reception capability information of the group;
    receiving, from the base station, a control signal including a channel state information (CSI) process configuration of the group;
    receiving a reference signal from the base station;
    determining, by the first UE, an indication of UE-specific channel state based on the reference signal;
    transmitting the indication of UE-specific channel state to the second UE via a local wireless network;
    receiving an indication of joint channel state from the second UE via the local wireless network; and
    transmitting the indication of joint channel state to the base station.

18. The method of claim 17, wherein the CSI process configuration includes one or both of time domain information, and frequency domain information, for the reference signal.

19. The method of claim 18, further comprising:
    before receiving the control signal, transmitting UE-specific reception capability information to the second UE via the local wireless network; and
    receiving joint reception capability information of the UE group from the second UE via the local wireless network.

* * * * *